Figure 1:
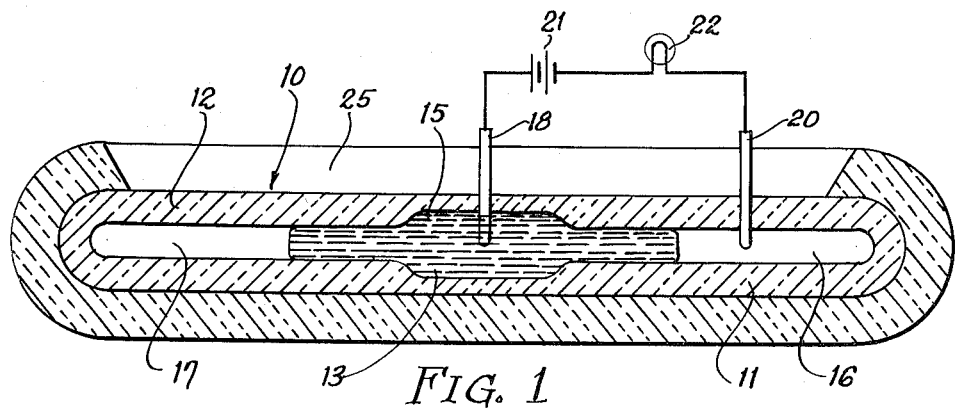

Feb. 1, 1966  P. G. SALERNO  3,232,119
ACCELEROMETER
Filed Sept. 4, 1962

INVENTOR.
Paul G. Salerno
BY [signature]
Atty

3,232,119
ACCELEROMETER
Paul G. Salerno, Glenview, Ill., assignor to Vapor Corporation, Chicago, Ill., a corporation of Delaware
Filed Sept. 4, 1962, Ser. No. 221,132
1 Claim. (Cl. 73—497)

This invention relates to an accelerometer and particularly to an accelerometer that is constructed to compensate automatically for the effects on its accuracy caused by variations in temperature.

The accelerometer of this invention is of the liquid inertia element type, specifically, one constructed of a capillarly tube containing a body of mercury between the gas-filled ends of the tube. When the capillary tube is accelerated in a direction having a component longitudinal to the tube, the inertia of the mercury body causes it to be displaced toward the end of the tube opposite the direction of acceleration. Accelerometers of this type are substantially frictionless and they never go out of adjustment due to wear or fatigue. In the discussion that follows and in the subsequent claim, the inertia element will be referred to as mercury; however, it is to be understood that other suitable liquids may be employed. Mercury is preferred because of its stability, density, and because it conducts electricity, which is important in electrical sensing of displacement.

When the mercury body is displaced by acceleration, it causes a diminished volume of gas between it and one end of the tube and an expanded volume of gas between it and the other end of the tube and, according to the gas laws, a differential pressure is created which tends to restore the body of mercury to its original position, with equal gas pressure on opposite sides. The acceleration is measured by calibrating the tube to indicate the acceleration required to produce the measured amount of displacement. The acceleration can be read directly from the calibrations or it can be indicated or recorded with some means of sensing the position of the mercury. For example, a number of electric contacts can be embedded in tube and they can be connected to become a conductive electric circuit when the mercury is displaced far enough to engage them. The mercury can also act as a conductor to produce varying capacitance between it and another conductor with the non-conductive capillary tube acting as the dielectric whereby the capacitance of the device can indicate displacement and, hence, acceleration. Also, a continuous resistance element can be progressively shorted-out by the displacement of the mercury to produce a varying current flow through the device that is proportionate to the displacement and thus to the acceleration.

As heretofore stated, the restoring force that tends to return the mercury to its stable position when acceleration ceases is the difference in the pressure between the gas filled ends of the tube. At any given temperature, the accelerometer may be calibrated with great accuracy. An accelerometer calibrated at a given temperature will have its mercury displaced a given amount by a given acceleration; however, if the absolute temperature of the entire device were doubled, even though the pressure on both sides of the mercury body would be doubled, the pressure difference, or restoring force at that same displacement, would also be increased so that at that same acceleration the mercury body would occupy a different position in the tube. At a higher temperature, a given acceleration will produce less displacement than at a lower temperature because a greater pressure differential is caused by the same change in volume of the gas filled ends.

It is an object of this invention to provide an accelerometer that is constructed to compensate for the effect of variations in temperature.

The accelerometer of this invention includes a capillary tube sealed at both ends and having a body of mercury medially spaced between the two sealed ends with a gas-filled space between the mercury body and each sealed end. The accelerometer of this invention is further provided with an enlarged portion, preferably a greatly enlarged portion that is positioned in the portion of the tube occupied by the mercury. This enlarged portion of the tube is filled with mercury and contains a relatively large quantity per unit of length as compared with the amount within the capillary portion of the tube.

The mass of the mercury and the diameter of the capillary tube are related so that the length of the mercury column varies approximately directly with the absolute temperature. Thus, as the temperature-produced increase in pressure difference across the mercury body pushes the mercury farther from the contact at a given acceleration, a temperature-produced expanded length of the mercury column positions the mercury closer to that contact approximately to the same extent.

This invention may be better understood with reference to the accompanying drawings which illustrate one device embodying this invention.

Figure 2:
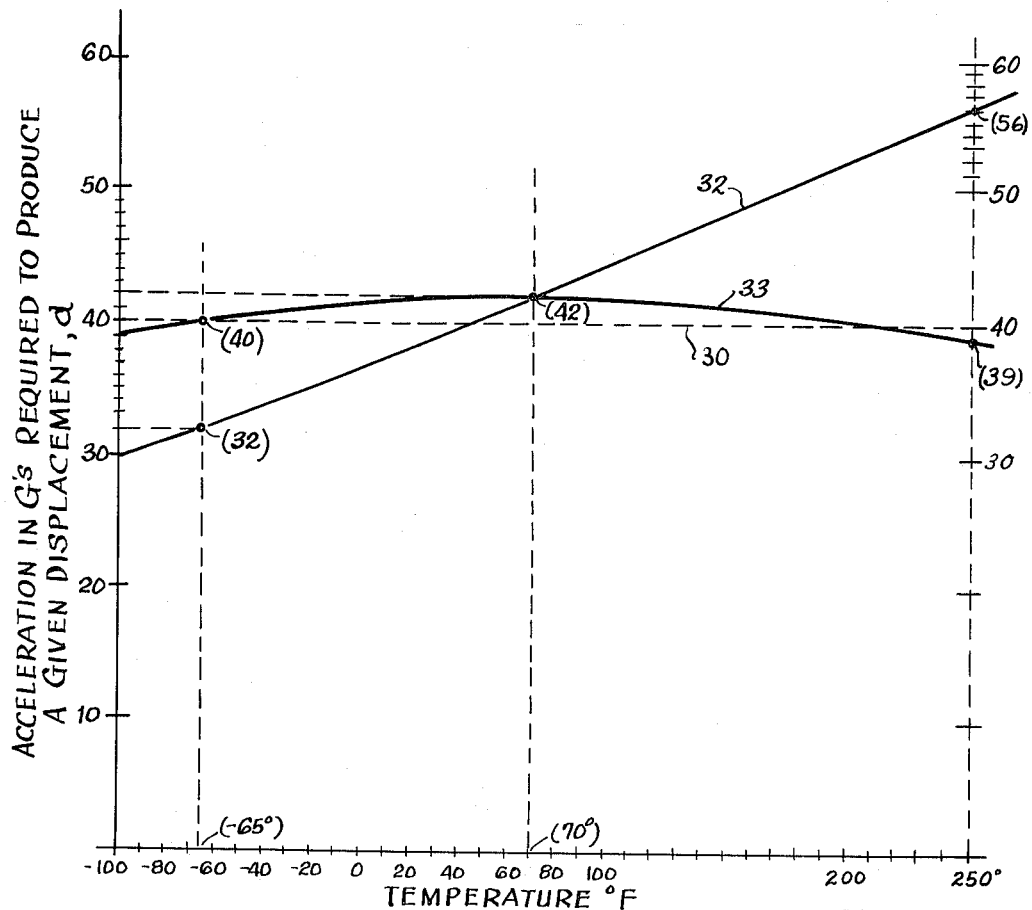

FIG. 1 is a sectional view that is partly in schematic illustrating an accelerometer embodying this invention; and FIG. 2 is a graphic representation illustrating the variation of displacement of a mercury inertia element at a given acceleration with varying temperatures for both a compensated and an uncompensated accelerometer.

The accelerometer illustrated in FIG. 1 is shown grossly out of proportion in that the actual glass and mercury element are usually relatively small, in the order of six inches or less in length and of the usual diameter for capillary tubes, while the electrical circuit may be of any size and of any degree of complexity. In the embodiment herein illustrated, which is a relatively simple embodiment, the accelerometer tube generally designated as 10 consists of a capillary end portion 11, a capillary end portion 12 and an expanded central portion 13. The center portion and the parts of the capillary portions immediately adjacent to it contain a body of mercury 15. The ends of capillary tubes 11 and 12 are sealed to provide spaces 16 and 17, respectively, which are filled with gas. The mercury body will move to a position where equal gas pressure exists in each of spaces 16 and 17. Preferably these spaces are of equal length and equal volume so that the mercury body is centered between them.

An electric conductor 18 is embedded in the expanded portion 13 so that it is immersed in mercury at all times while at least one other electric conductor 20 is embedded through the wall of the capillary tube and into the gas-filled space 16 in tube 11. The electric conductors are connected in a circuit which includes a power source 21 and an indicating or recording means herein illustrated as a lamp 22 so that when the mercury body is displaced sufficiently to contact conductor 20, it will complete the circuit and lamp 22 will light.

Insulation 25 may be provided if desired. Insulation is useful only in environments where changes in temperature are rapid and large, such as when used in aircraft where rapid changes in altitude are experienced. The insulation is not for the purpose of maintaining any given temperature, but just for the purpose of causing temperature changes to be slow enough so all parts of the accelerometer will be at the same temperature. If temperatures below the freezing point or above the boiling point of the liquid body are to be encountered, heating or cooling elements may be embedded in the insulation; however, there is no need to use close control of the temperature since maintaining the inertia element in a liquid state is all that is required.

As an aid to understanding this invention, the mathematical relationships involved will be developed for the general case of an accelerometer that is not temperature compensated. Such an accelerometer would appear as the accelerometer in FIG. 1, however, the expanded area 13 would be absent and the capillary tube would have a bore of uniform diameter throughout its length. Assuming the mercury to be centered in the tube so that the distance between it and the sealed end on each side is equal, the volume of space 16 is equal to the volume of space 17, the pressure in space 16 is equal to the pressure in space 17 and the relationship $P_0V_0 = P_0'V_0'$ where the subscript 0 indicates no acceleration, is obvious. When the tube is accelerated in the direction of its axis and toward the capillary tube 12, the mercury is displaced into space 16 and the volume of space 17 increases while the volume of space 16 decreases. The space 17 accordingly has a reduced pressure $P_1$ while the space 16 has an increased pressure $P_2$. The force, or mass times acceleration, that the inertia of the liquid must overcome is the difference in these pressures times the area of the capillary tube or:

$$F = (P_1 - P_2)A = Ma$$

The mass M equals the length of the mercury in the tube times the cross-section area of the tube times the density of the mercury which may be expressed as:

$$M = \frac{L_m A W}{g}$$

where $g$ is the acceleration of gravity. Equating these two expressions, the relationship:

$$(P_1 - P_2)A = \frac{L_m A W_a}{g}$$

or, cancelling A from both sides of the equation and expressing the relationship in terms of acceleration in units of gravities:

$$\frac{a}{g} = \frac{P_1 - P_2}{L_m W}$$

For purposes of deriving a workable equation, it is desirable to eliminate the pressure function from the equation. The relationship $PV = mRT$ is the perfect gas law and since, in this device V is equal to the cross-section area of the capillary tube times the length between its end and the mercury, the expression can be stated as $PLA = mRT$. Thus P can be stated as $$P = \frac{mRT}{LA}$$

and the equation can thus be written:

$$\frac{a}{g} = \frac{\frac{m_1 R T_1}{L_1 A} - \frac{m_2 R T_2}{L_2 A}}{L_m W}$$

and since both sides of the accelerometer have the same amount of gas and are at the same temperature, the equation may be stated as:

$$\frac{a}{g} = \frac{\frac{mRT}{A}\left(\frac{1}{L_1} - \frac{1}{L_2}\right)}{L_m W}$$

During acceleration, the length of the space 16 is the original length minus the displacement, and the length of space 17 is the original length plus displacement, or:

$$L_1 = L_0 - d \text{ and } L_2 = L_0 + d$$

so that $$\frac{1}{L_1} - \frac{1}{L_2} = \frac{1}{L_0 - d} - \frac{1}{L_0 + d}$$

which equals $$\frac{2d}{L_0^2 - d^2}$$

Accordingly, the expression may be written:

$$\frac{a}{g} = \frac{mRT}{AL_m W}\left(\frac{2d}{L_0^2 - d^2}\right)$$

From this expression, it may be seen that as the temperature rises, a given acceleration will produce a lesser displacement. It may also be seen that as the length of the mercury column increases, a given acceleration will produce a greater displacement.

In the present invention, advantage is taken of the ability of mercury to expand with temperature. The mass of mercury present, which is regulated by the size of the bulb 13, is controlled so that its expansion will cause $L_m$, or the length of the mercury in the tube, to increase directly proportional to the temperature. Thus, as the displacement due to acceleration changes because of the temperature effect on the pressure differential, the length of the mercury element due to temperature will change the displacement in the opposite direction and approximately to the same extent, thereby cancelling the adverse effect.

This adverse temperature effect is demonstrated graphically in FIG. 2 in which rising temperature in degrees F. is indicated along the abscissa and the acceleration in G's required to displace the mercury a given distance along the ordinate. In an ordinary mercury accelerometer, the pressure difference across the mercury body in any given position of displacement varies directly with the temperature. Broken line 30 is parallel to the abscissa and 40 G's above it. Line 32 indicates that the variation in acceleration to produce a given displacement varies linearly with temperature, and thus, the farther the temperature is from the temperature at which the instrument was calibrated the greater the error.

Employing the accelerometer of this invention, a curve such as 33 is obtained where the expanding mercury compensates for the increased pressure differential. No linear relationship between accuracy and absolute temperature exists, but a flat, almost horizontal, parabolic curve 33 closely approximating a straight line is obtained. It may be seen that over very wide temperature ranges, the acceleration to produce a given displacement will be approximately the same, and one calibration of the accelerometer will serve to indicate accurately the acceleration being sensed.

As a specific example of one accelerometer built in accordance with this invention, the following is presented:

The accelerometer is a capillary tube having an overall length of five inches. It is filled with sufficient mercury (the exact amount to be later defined) which when centered leaves a gas filled space on each side that is two inches long, and the mercury column one inch long. The tube has a diameter of .008 inch and each of the gas spaces is filled with air at a pressure of 115 pounds per square inch absolute. In the center of the mercury filled portion, a bulb that contains a volume of 0.006 cc's. of mercury is placed. This bulb may have any distribution of diameter and length desired so long as the length does not exceed one inch, and a typical distribution of diameter and length is a bulb 0.125 inch in length and 0.061 inch in diameter.

For the accelerometer thus defined, the curve of temperature versus acceleration required to produce a given displacement is as shown in FIG. 2. At 395° R. or approximately −65° F., an acceleration of 40 G's produces a given displacement, at 530° R. or approximately 70° F., an acceleration of 42 G's is required to produce that displacement, and at 710° R., or approximately 250° F., an acceleration of 39 G's is required to produce that displacement. An accelerometer without the temperature compensating bulb of mercury of this invention, such as those of the prior art, having all dimensions the same as above described except for the bulb in the mercury portion, has the following characteristics which are also graphically described in FIG. 2. At a temperature of −65° F., and acceleration of 32 G's will produce the same given displacement, at 70° F., it requires 42 G's to produce that displacement, and at 250° F., it requires 56 G's to produce that displacement.

It may be seen from the above that over a very wide temperature range, greater than from −55° F. to +250° F., the compensated accelerometer of this invention provides substantially constant displacement for a given acceleration, while an accelerometer that is identical, except that it is not temperature compensated in accordance with this invention, varies almost by a factor of 100% in accuracy over the same temperature range.

It is evident that variations in the material of construction, the selection of sensing means which may be electrical or not, the pressures, linear dimensions, or the physical or chemical properties of the materials may easily be made to suit particular needs within the scope of this invention. It is accordingly intended that the invention be limited only by the claim.

What is claimed is:

An accelerometer of the liquid inertia element type comprising, a sealed, elongated container having a hollow tubular central portion and two coaxially aligned linear tubular end portions of substantially smaller inside diameter than said central portion extending from opposite ends of the latter, each of said end portions communicating openly at one end with said central portion and being sealed at the other end thereof; a body of mercury comprising a liquid inertia element of predetermined mass sealed in said container and filling said central portion and partially filling said end portions, the volume of mercury in said central portion being sufficient, in relation to the inside diameter of said end portions and the volume of mercury in the latter, to cause the length of the body of mercury to vary substantially directly as the absolute temperature of the accelerometer, a pair of substantially like gas atmospheres located one between said body of mercury and the sealed end of each of said end portions, and means adapted to indicate predetermined displacement of said mercury from its normal position of rest.

References Cited by the Examiner
UNITED STATES PATENTS

| | | | |
|---|---|---|---|
| 660,050 | 10/1900 | Cowey | 73—382 |
| 1,319,036 | 10/1919 | Barus | 73—516 |
| 2,052,185 | 8/1936 | Lewis | 73—382 |
| 2,407,363 | 9/1946 | Bussey | 137—38 X |
| 2,840,366 | 6/1958 | Wing | 73—497 |
| 3,002,390 | 10/1961 | Miller | 73—516 |
| 3,024,662 | 3/1962 | Ryan | 73—516 |

RICHARD C. QUEISSER, *Primary Examiner.*

ROBERT EVANS, JAMES J. GILL, *Examiners.*